J. BEAN.

Pump.

No. 6,703. Reissued Oct. 19, 1875.

WITNESSES

Franck L. Durand

C. L. Emerson.

By

INVENTOR

John Bean

Alexander Mason

Attorney

N. PETERS, PHOTO-LITHOGRAPHER, WASHINGTON, D. C.

UNITED STATES PATENT OFFICE

JOHN BEAN, OF HUDSON, MICHIGAN.

IMPROVEMENT IN PUMPS.

Specification forming part of Letters Patent No. 86,804, dated February 9, 1869; reissue No. 6,703, dated October 19, 1875; application filed September 2, 1875.

*To all whom it may concern:*

Be it known that I, JOHN BEAN, of Hudson, in the county of Lenawee and State of Michigan, have invented certain new and useful Improvements in Pumps; and I do hereby declare that the following is a full, clear, and exact description thereof, reference being had to the accompanying drawings, and to the letters of reference marked thereon, which form a part of this specification.

The nature of my invention consists in the construction and arrangement of a pump, as will be hereinafter more fully set forth.

In order to enable others skilled in the art to which my invention appertains to make and use the same, I will now proceed to describe its construction and operation, referring to the annexed drawing, in which—

Figure 1:
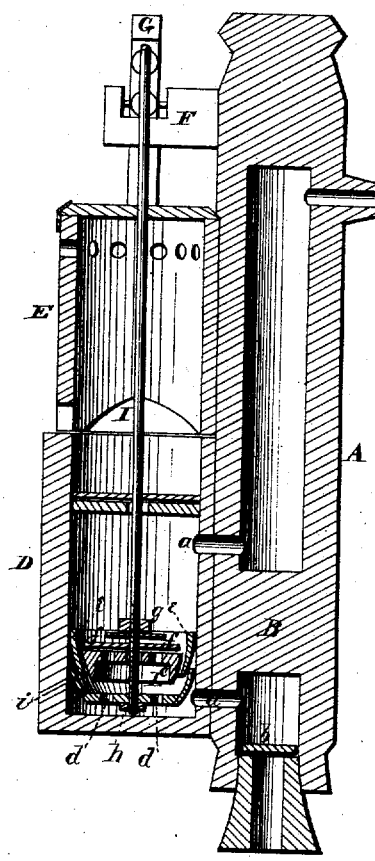
Figure 2:
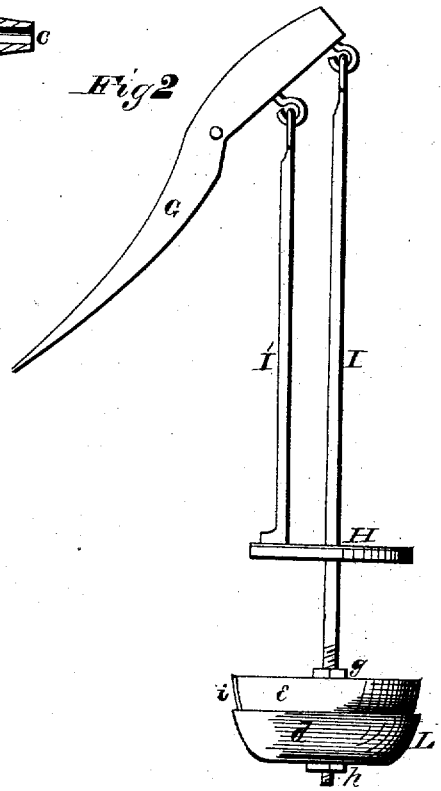

Figure 1 is a longitudinal vertical section of my pump. Fig. 2 is a side view of the plungers and rods.

A represents a pump-stock, constructed with a partition, B, and two openings, *a a*, one above and one below the said partition. At the lower end of the pump-stock A is a valve, *b*, which opens upward, allowing the water to be drawn up by the action of the plungers, and the valve closes when the plungers move downward, so as to prevent the water from going back again. C is the spout or outlet for the water from the pump-stock A. On the side of the pump-stock is a cylinder, D, made of stone, glass, wood, or other suitable material, and provided with openings corresponding with the openings *a a*, and said cylinder extends only a short distance below the lower opening *a*. This cylinder D is closed at the bottom and open at the top, and over the top is placed a cap, E, having perforated sides to secure perfect and free ventilation.

The chamber D is inserted within the well from three to fifty feet, according to the depth of the well. The ventilating-cap E has openings on two sides at its bottom, and follows the chamber down into the well, with its top extended above the platform, and nearly or as high as the pump-handle. The movement of the rods in the chamber through the ventilating-cap agitates the air, and forms a draft in and out of the well through the open spaces on the lower ends of the cap. This cap or top E is made as large as, or a little larger than, the cylinder, so that the buckets may be taken up through the cap without disturbing the platform or the pump-stock. By the up-and-down motion of the upper bucket the space above the cylinder is opened and filled with air, which is agitated by the rods, so that the chamber forms a ventilator, as set forth.

At the upper end of the pump-stock A is an arm, F, to which the pump-handle G is pivoted. To this handle, and on the same side of the fulcrum or pivot point, are attached two rods, I I′, of different lengths, which descend into the cylinder, and to the lower ends of which the buckets are secured, the longer rod I having the suction-bucket L, and the shorter rod I′ the force-bucket H, secured to it. The rods I I′, with their buckets, are so arranged that the rod I′, with its bucket H, only moves half the distance of the other, and the rod I passes through the bucket H. Thus the lower bucket L draws the water up into the cylinder when the rods are being raised; then, when the rods are being lowered, the water passes up through the lower bucket, and the upper bucket H presses or forces part of the water through the upper opening *a* into the pump-stock A and out through the spout C.

After the pump is once started, it throws a steady stream of water at the upstroke of the lever equal with the down-stroke. This is accomplished by one-half of the water flowing up with the top bucket, while the other half of the water flows up the pipe or stock while the lower bucket is filling, thus making a force-pump for fire purposes.

The lower bucket L consists of two cups, *c* and *d*, the lower cup *d* having a flange extending upward, and the upper cup *c* a similar flange extending downward. The packing *e* is cut in the usual form, and placed in the lower cup *d*. The cup *c* is then placed inside of the former. Where the leather packing *e* comes together is placed a metal plate, *i*, which covers the joint, and prevents the packing from slipping down and letting the water through. On top of the cup *c* is placed a circular valve, *f*, covering the whole surface of the cup. The rod I then passes through the cups *c* and *d*, both of which are perforated, as shown in Fig. 1, and is fastened by a nut, *h*,

BEST AVAILABLE COPY on the lower side of the cup *d*, the rod being for that purpose provided with screw-threads. A nut, *g*, is, however, first placed on the rod at a suitable distance from the lower end, so as to form a bearing against which the upper cup may rest.

The advantages of a bucket constructed as above described are obvious. It holds the packing of any thickness firmly, by opening or sliding together; for thin or thick packing, by tightening or loosening the nut *h* at the bottom. The side plate *i* holds the packing from opening or sagging down, and keeps it tight from leaking, while the side plate will spring out by the pressure of the water on the bucket and keep the bucket tight, then falls back as the bucket recedes, relieving the friction. It will also be seen that the packing can easily be removed and replaced in case it is necessary to repair the same.

Having thus fully described my invention, what I claim as new, and desire to secure by Letters Patent, is—

1. In a pump, the two rods I I′, when attached to the handle or lever of the pump on the same side of its fulcrum, one operating as a suction-rod and the other as a force-rod, in combination with buckets or plungers, operating in one and the same cylinder, substantially as set forth.

2. The perforated ventilating-cap E, in combination with the pump-cylinder D and stock A, for the purposes herein set forth.

3. The combination of the pump-stock A with side cylinder D, having a ventilating-cap, E, rods I I′, and buckets H and L, constructed and operating substantially in the manner and for the purposes herein set forth.

4. In a pump, the combination of two plungers, working within one cylinder in the same direction, but at different rates of speed, for the purposes herein set forth.

In testimony that I claim the foregoing I have hereunto set my hand and seal this 24th day of August, 1875.

JOHN BEAN. [L. S.]

Witnesses:
JOSIAH H. DRUMMOND,
ELZADA R. DRUMMOND.